United States Patent [19]

Meier

[11] Patent Number: 4,748,891
[45] Date of Patent: Jun. 7, 1988

[54] HYDRAULIC SYSTEM

[75] Inventor: Ghert Meier, Stadel, Switzerland

[73] Assignee: Contraves AG, Zürich, Switzerland

[21] Appl. No.: 910,448

[22] Filed: Sep. 22, 1986

[30] Foreign Application Priority Data

Oct. 4, 1985 [CH] Switzerland .................. 04304/85

[51] Int. Cl.$^4$ ............................................. F41D 7/04
[52] U.S. Cl. ............................................ 89/12; 60/424; 89/129.01
[58] Field of Search ............... 89/9, 11, 12, 13.05, 89/13.1, 1.41, 129.01, 129.02; 60/424

[56] References Cited

U.S. PATENT DOCUMENTS

| | | | |
|---|---|---|---|
| 3,490,568 | 1/1970 | Miller et al. | 89/9 |
| 3,788,075 | 1/1974 | Holdemann et al. | 60/424 |
| 3,921,499 | 11/1975 | Ginsky | 89/12 |
| 3,990,235 | 11/1976 | Bauchet | 60/413 |
| 4,046,056 | 9/1977 | Carrie . | |
| 4,129,258 | 12/1978 | Mott et al. | 60/424 |
| 4,649,706 | 3/1987 | Hutson | 60/424 |

FOREIGN PATENT DOCUMENTS

| | | | |
|---|---|---|---|
| 2134569 | 1/1972 | Fed. Rep. of Germany | 200/15 R |
| 2714957 | 10/1977 | Fed. Rep. of Germany | 209/564 |
| 1199516 | 6/1959 | France | 198/464.2 |
| 2100265 | 2/1972 | France | 420/129 |
| 2061467 | 5/1981 | United Kingdom | 411/15 |

Primary Examiner—Stephen C. Bentley
Assistant Examiner—Stephen M. Johnson
Attorney, Agent, or Firm—Werner W. Kleeman

[57] ABSTRACT

A hydraulically operated rotational drive system, preferably for a Gatling cannon or gun, comprises a first hydraulic motor for the driving phase and sustenance of a predeterminate operating speed as well as for base load operation for the braking phase, and being continually operatively connectable to a second hydraulic auxiliary motor. During the start-up or run-up phase, until attaining the required speed, as well as during the braking or deceleration phase, this second hydraulic motor is operatively and/or controllably, automatically connectable to the first hydraulic motor for energy-saving operation. Operative and controllable connection of the first and second hydraulic motors is accomplished by means of an operative connection of the hydraulic system with the hydraulic motors on the one hand and with a pressure source and a tank on the other hand. This hydraulic system comprises several supply lines, return lines, control lines and bypass lines, as well as valves, which are controllable and/or switchable according to requirements.

4 Claims, 4 Drawing Sheets

HYDRAULIC SYSTEM

BACKGROUND OF THE INVENTION

The present invention broadly relates to a new and improved hydraulic system.

In its more specific aspects the present invention relates to a new and improved hydraulically operated drive, in particular a rotational drive for a Gatling cannon or gun, comprising motor means and a control system for speed control.

A known state of the art construction of the aforementioned type of apparatus comprises a hydraulically operated rotational drive of which the rotating mass is accelerated in a relatively short time to a high operating speed and decelerated rapidly by means of the rotational drive. This rotational drive is dimensioned for the maximum required torque, thus over-dimensioned for applications requiring essentially no more than the sustenance of the operating speed.

For the sustenance of the operating speed the heretofore known rotational drive only requires a relatively low torque, respectively a relatively low hydraulic pressure applied to the hydraulic motor. As a consequence the pressure of the hydraulic medium supplied to the drive system needs to be reduced considerably by throttling the hydraulic medium after attaining the operating speed. The throttling causes losses which, in turn, lead to a low efficiency of the rotational drive system or drive.

SUMMARY OF THE INVENTION

Therefore, with the foregoing in mind, it is a primary object of the present invention to provide a new and improved construction of a hydraulic system which does not exhibit the aforementioned drawbacks and shortcomings of the prior art constructions.

A further significant object of the present invention is directed to providing a new and improved hydraulic system for a drive of the aforementioned type which exhibits a compact construction together with improved operational efficiency.

Now in order to implement these and other objects of the present invention which will become more readily apparent as the description proceeds, the apparatus of the present development is manifested by the features that there is provided a hydraulic drive system for the rotational drive of a Gatling cannon or gun and which rotational drive comprises a primary hydraulic driving, operating and braking motor or briefly a primary hydraulic motor, and a secondary hydraulic auxiliary motor. The rotational drive defines a common rotary drive system acting on a rotor of the Gatling cannon or gun and mechanically couples the primary hydraulic motor and the secondary hydraulic motor to the rotor of the Gatling cannon or gun. The hydraulic system comprises supply lines, return lines and control lines as well as valves. The primary hydraulic motor and the secondary hydraulic motor are operatively connected with the supply line, the return line, the control line and the valves of the hydraulic system such that the secondary hydraulic auxiliary motor can be automatically, and controllably brought into supporting coacting relationship with the primary hydraulic motor.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components. The drawings show, in a practical application, a schematically depicted section of a Gatling cannon or gun with an associated drive, as well as a hydraulic control system under different operating conditions depicted as a block diagram, wherein.

DETAILED DESCRIPTION OF THE PREFERRED EMBODIMENTS

Figure 1:
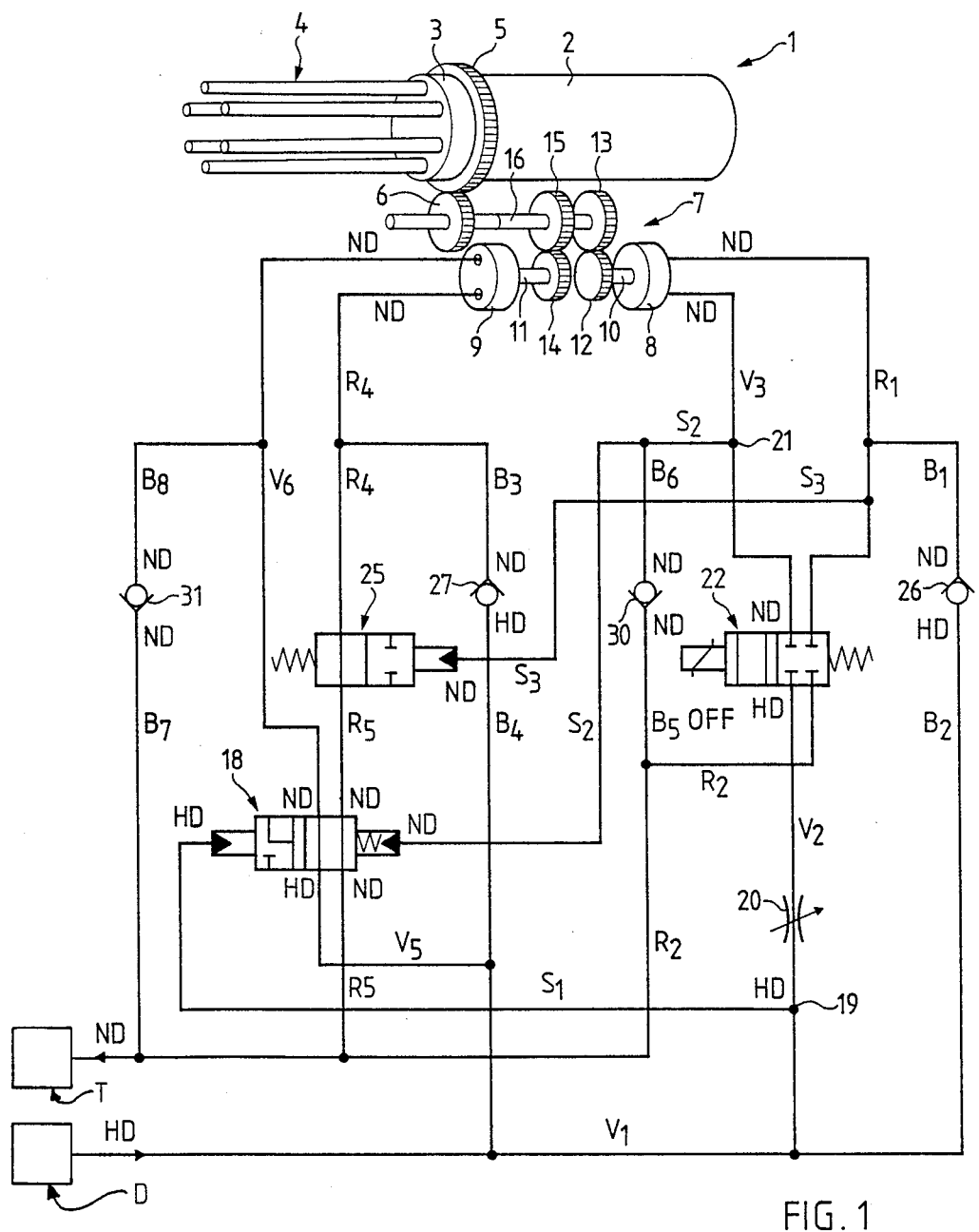
FIG. 1 shows a block diagram of the hydraulic control system in operational readiness.

Describing now the drawings, it is to be understood that to simplify the showing thereof only enough of the structure of the hydraulic control system or hydraulic system has been illustrated therein as is needed to enable one skilled in the art to readily understand the underlying principles and concepts of the present invention. Turning now specifically to FIGS. 1 to 4 of the drawings, the inventive hydraulic system illustrated therein by way of example and not limitation will be seen to comprise a hydraulic control system shown as a block diagram. FIGS. 1 to 4 differ from each other solely by the different status of the operating phase, indicated by different pressure symbols. The reference numeral 1 designates by way of example a cannon or gun operating according to the Gatling principle, comprising a rotatably supported rotor 3 in a weapon housing 2. This rotor 3 supports a cluster of weapon barrels 4 and is essentially operatively connected, by means of a pair of gears 5 and 6, with a rotational drive 7, such that a fast start-up or run-up phase and braking or deceleration phase can be achieved.

The rotational drive 7, which is in continuous driving connection via the pair of gears 5 and 6 with the rotor 3, comprises two hydraulic motors 8 and 9, e.g., in a conventional embodiment these two hydraulic motors 8 and 9 may operate in accordance with the principles of standard axial piston motors, of which the shafts 10 and 11 conjointly act on a shaft 16 via gears 12 and 13, respectively 14 and 15. This shaft 16 bears the one gear 6 for driving the cannon rotor 3. The first hydraulic motor 8 is a primary hydraulic motor and is provided for handling the base load of the drive of the Gatling cannon or gun and is dimensioned such that it is able to maintain for an extended period of time a set operating speed of the Gatling cannon or gun which is reached with the aid of the second hydraulic motor 9. The first hydraulic motor 8 operates with the hydraulic pressure throttled sufficiently for speed control of the Gatling cannon or gun over an extended operating time.

This second hydraulic motor 9 is a secondary hydraulic auxiliary motor and can be supportingly connected to the first hydraulic motor 8 only for such cases where significant, adjustable speed deviations occur, such as during the start-up or run-up phase, or during the braking or deceleration phase. The connection of the second hydraulic motor 9 occurs automatically by means of the control valve 18, which is actuated as a function of the line pressure of a supply line arrangement or system $V_1$, $V_2$ and $V_3$ leading to the first motor 8. The control lines $S_1$ and $S_2$ necessary for this purpose branch off this supply line arrangement or system $V_1$, $V_2$ and $V_3$. A first junction 19 for the control line $S_1$ is arranged preceding flow rate control valve 20 for flow rate control of the hydraulic fluid to the first hydraulic motor 8. A second junction 21 for the control line $S_2$ is arranged preceding an input/output shutoff valve 22 arranged within the supply lines $V_2$, $V_3$ of the supply line arrangement or system $V_1$, $V_2$ and $V_3$.

A supply line or supply line arrangement $V_5$, $V_6$ in which there is arranged the control valve 18 serves for the propulsion or drive of the second hydraulic auxiliary motor 9. $R_1$ and $R_2$ as well as $R_4$ and $R_5$ are the designations for return lines connected to the hydraulic motors 8 and 9. There is arranged within the return lines or return line arrangement $R_4$, $R_5$ an additional braking valve 25. The return lines or return line arrangement $R_1$, $R_2$ and $R_4$, $R_5$ lead to a conventional tank or reservoir, which has been conveniently symbolically represented by reference character T. The supply line arrangement $V_1$, $V_2$, $V_3$ as well as $V_5$, $V_6$ lead away from a conventional pressure source D.

FIGS. 1 to 4 show the operating conditions before and after the valves 18, 22 and 25 which as a matter of drafting convenience have been depicted under non-pressurized condition although the actual pressure conditions before and after these valves will be fully considered hereinafter with reference to these FIGS. 1 to 4. The pressure conditions of the fluid medium within the respective lines are for instance indicated by HD, ND and ZD. HD stands for high pressure, ND for low pressure, e.g., zero, and ZD for intermediate pressure, a value lying between the values high pressure HD and low pressure ND.

Under operational readiness of the hydraulic drive system 7, in accordance with FIG. 1, the supply line arrangement or supply lines $V_1$, $V_2$ and $V_5$ feeding the hydraulic motors 8 and 9 are under the full high pressure HD as supplied by the pressure source D up to the valves 22 and 18. In addition full high pressure HD exists within two by-pass lines $B_1$, $B_2$ and $B_3$, $B_4$ which bridge or shunt the valves 18, 25 and 22 up to the related check valves 26 and 27.

Figure 2:
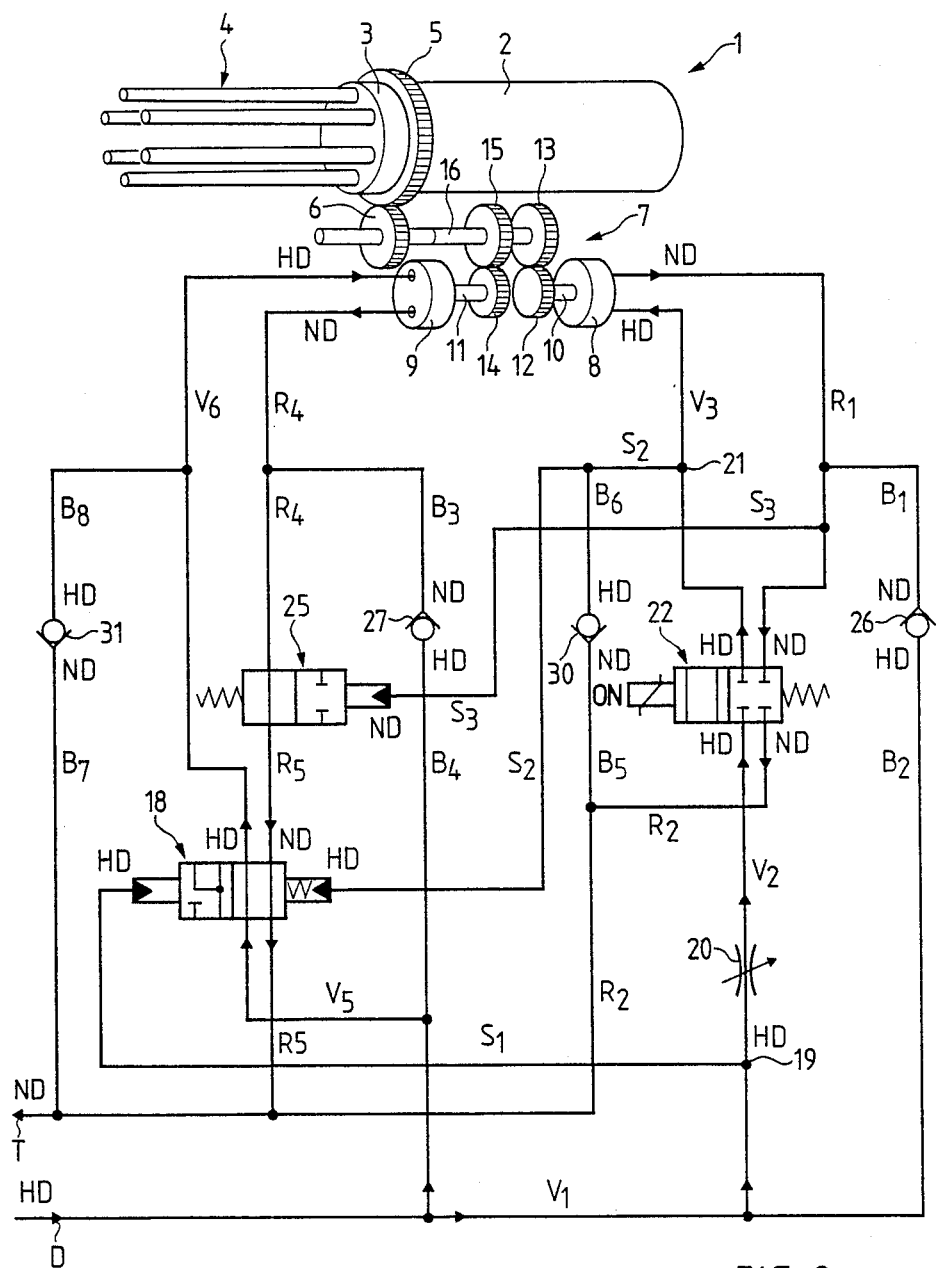
FIG. 2 shows the hydraulic control system according to FIG. 1 during the start-up or run-up phase.

FIG. 2 depicts the condition of the hydraulic control or regulating system after opening the, for instance, solenoid-operated blocking or shutoff valve 22. The hydraulic drive 7 is in a start-up condition with maximum acceleration. The blocking or shutoff valve 22 simultaneously opens and closes the supply line $V_1$ with respect to the supply line $V_3$ as well as the return lines $R_1$ and $R_2$. In this state of operation the lines $V_1$, $V_3$, $R_1$, $R_2$ are open. The fluid flow rate control valve 20 is also fully open. Since the opening of the blocking or shutoff valve 22 causes full pressure rise within the control line $S_2$ feeding the control valve 18, this control valve 18 opens such that the resultant operative connection between lines $V_5$ and $V_6$ as well as return line $R_5$ causes the start-up, with unified full power, of both hydraulic motors 8 and 9. Just as was the case for the blocking or shutoff valve 22 with respect to opening of the return lines $R_1$ and $R_2$ the control valve 18 opens the return lines $R_4$ and $R_5$, leading from the second hydraulic motor 9 and feeding the fluid or hydraulic medium back to the reservoir or tank T. The brake valve 25 arranged within the return lines $R_4$, $R_5$ is fully open whenever the low pressure ND is applied to the control line $S_3$ connected to the return line $R_1$.

Figure 3:
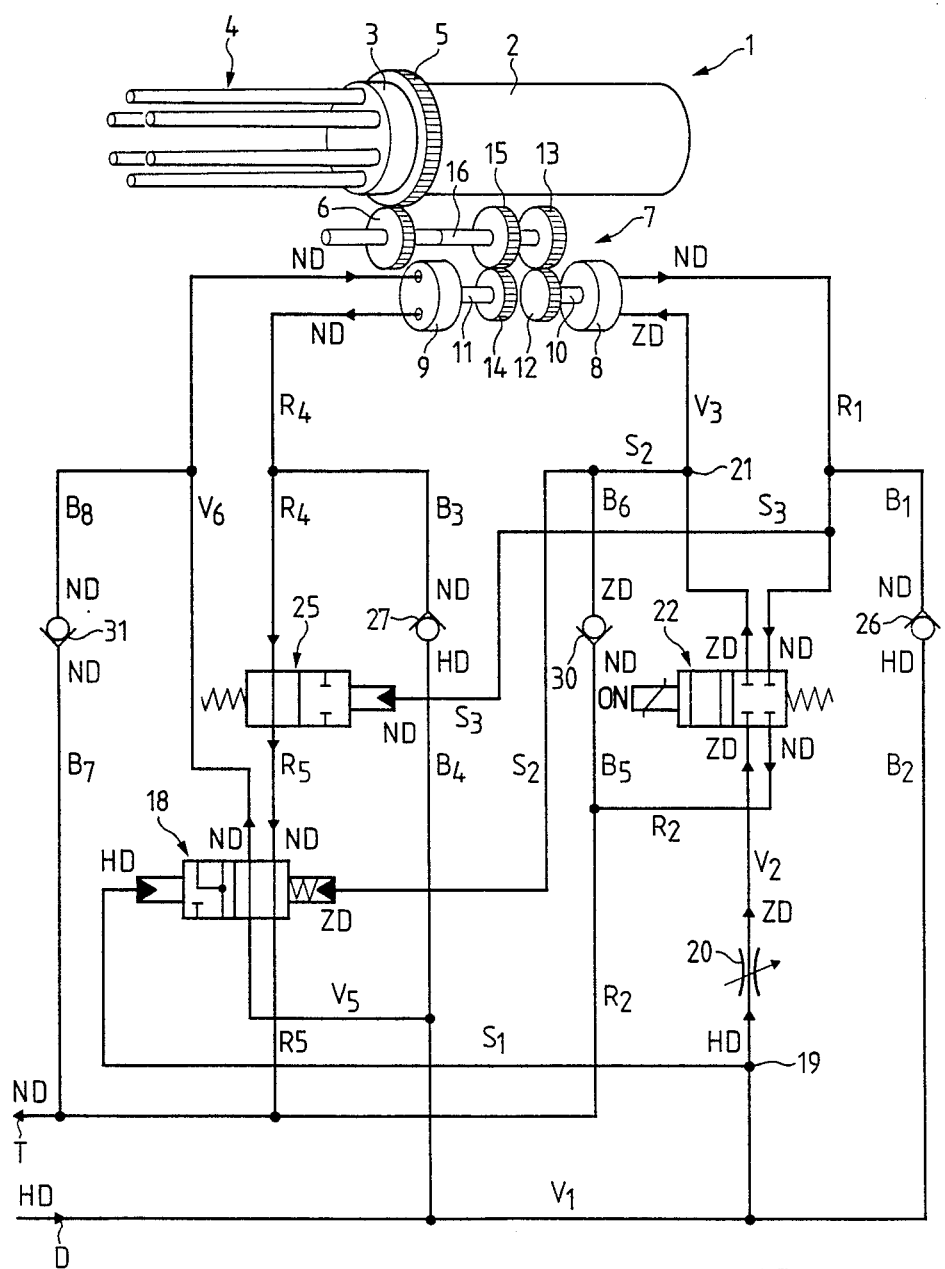
FIG. 3 shows the hydraulic control system according to FIG. 1 during the operating phase with speed control in effect.

After the start-up phase according to FIG. 2 there follows the condition of maintaining a desired regulated rotational speed corresponding to the pressure conditions prevailing according to FIG. 3. The hydraulic pressure required for generating the torque at the first hydraulic motor (base load motor) 8 corresponds to the intermediate value ZD; this hydraulic pressure is controlled by the flow rate control valve 20 as a function of the speed of the rotational drive 7. The reduced intermediate pressure ZD within the supply line $V_3$ feeding the first hydraulic motor 8 is also present within the therewith connected control line $S_2$, such that the higher pressure ahead of or upstream of the flow rate control valve 20 and within the therewith connected control line $S_1$ keeps closed the control valve 18 which controls the second hydraulic motor 9. Thus, the second hydraulic motor 9 does not provide any additional power. Thus operation of the control valve 18 takes place only and exclusively as a function of the pressure difference HD/ZD within the supply lines $V_1$ to $V_3$ and the control lines $S_1$ and $S_2$.

Figure 4:
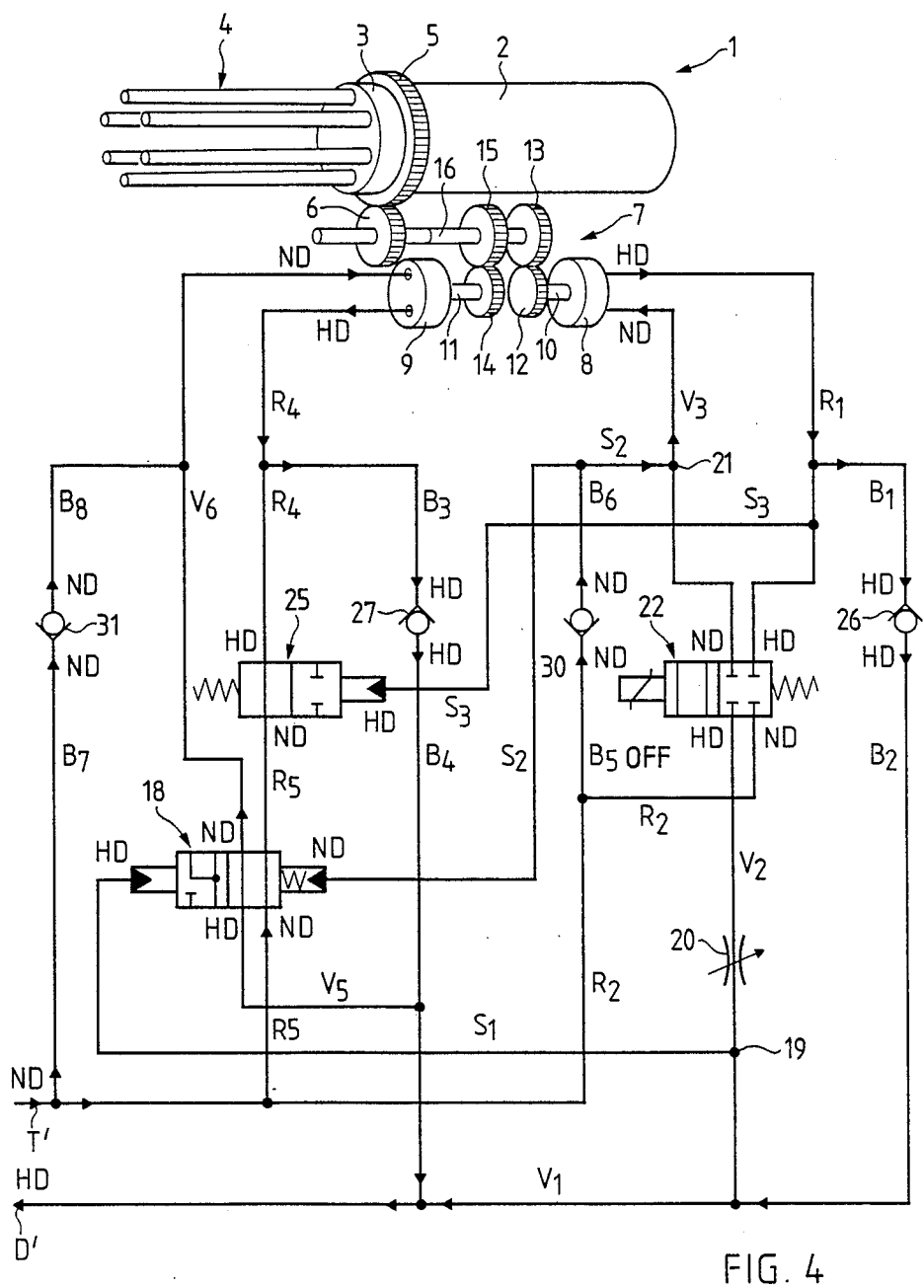
FIG. 4 shows the hydraulic control system according to FIG. 1 during the braking or deceleration phase of the rotational drive.

FIG. 4 shows the condition of the hydraulic control system as well as the operation of the individual valves 18, 22, 25, 26, 27, 30 and 31 during the braking phase of the rotational drive 7. Thus equal pressure values HD or ND on both sides of the respective valve indicate that this valve is open, as can be seen at the check valves 26, 27 as well as 30 and 31. Different pressure values at the valves 22, 18 and 25 indicate that these valves are closed during the braking phase.

The braking phase is essentially started by closing the magnetically operated ON/OFF shutoff valve 22. This has the effect that the hydraulic drive medium no longer reaches the first hydraulic motor 8 through the supply line arrangement $V_1$, $V_2$, $V_3$, causing the first hydraulic motor 8 to change to its pumping operation, and which first hydraulic motor 8 is now driven by the torque generated by the inertia of the Gatling gun or cannon rotor 3. This causes pressure generation within the return line $R_1$ and opening of the check valve 26 located within the by-pass lines or line arrangement $B_1$, $B_2$, such that the hydraulic medium is fed back, in a power-recuperating manner, to the pressure source D. The pressure increase which develops during the braking phase within the return line $R_1$, also causes a pressure increase within the control line $S_3$, which is connected to the return line $R_1$ and leads to the braking valve 25 causing this braking valve 25 to close. This causes the continuously co-running second hydraulic motor 9, in pumping operation, to feed hydraulic medium, in a power-recuperating manner, via bypass line $B_3$ and $B_4$ and the therewith opening check valve 27, back to the pressure source D. During this procedure (braking phase) the hydraulic medium which is aspirated or removed from the tank T, on the one hand, is fed through an additional bypass line arrangement or by-pass lines $B_5$, $B_6$ provided with a check valve 30 and the supply line $V_3$, by the pumping action of the first hydraulic motor 8, and on the other hand, through an additional bypass line arrangement or by-pass lines $B_7$, $B_8$ provided with a check valve 31 and the supply line $V_6$ by the pumping action of the second hydraulic motor 9, as shown in FIG. 4.

The valves used in the hereinbefore described hydraulic control system as shown in FIGS. 1 to 4 are constructed in conventional fashion according to the described functions thereof. Therefore, their depiction herein is only symbolic, in the pressure-free state and in accordance with the International Standard ISO 1219.

While there are shown and described present preferred embodiments of the invention, it is to be distinctly understood that the invention is not limited thereto, but may be otherwise variously embodied and practiced within the scope of the following claims. Accordingly,

What I claim is:

1. A hydraulic system for a rotational drive for a Gatling cannon, said rotational drive containing a primary hydraulic motor and a secondary hydraulic motor, a common rotary drive system for acting on a rotor of the Gatling cannon, means for mechanically coupling said primary hydraulic motor and said secondary hydraulic motor to said common rotary drive system, said hydraulic system comprising:

supply lines, return lines and control lines as well as valves operatively interconnected to provide a hydraulic circuit;

said primary hydraulic motor and said secondary hydraulic motor being operatively connected with said supply lines, said return lines, said contorl lines and said valves such that said secondary hydraulic motor can be automatically and controllably brought into supporting coactive relationship with said primary hydraulic motor;

said supply lines including first supply line means feeding hydraulic fluid to said secondary hydraulic motor;

said valves including a first control valve included in said first supply line means feeding said hydraulic fluid to said secondary hydraulic motor;

said supply lines further including second supply line means feeding hydraulic fluid to said primary hydraulic motor;

said first control valve being connected via selected ones of said control lines at predetermined connecting points to selected ones of said second supply line menas feeding hydraulic fluid to said primary hydraulic motor;

said first control valve comprising means for responding to a pressure difference originating at said selected ones of said second supply line means feeding hydraulic fluid to said primary hydraulic motor;

a flow rate regulating valve connected with said selected ones of said second supply line means between said predetermined connecting points for said control lines;

selected ones of said return lines being respectively connected to said primary and said secondary hydraulic motors;

a tank connected with said selected ones of said return lines;

said selected ones of said return lines containing predetermined associated valves of said valves including said first control valve for shutting off said selected ones of said return lines during a braking phase of the rotational drive;

bypass lines for bypassing said associated valves;

said valves including an associated check valve for each said bypass lines;

a pressure source connected with said bypass lines; and a selected one of said predetermined associated valves contained in said selected ones of said return lines being operatively connected with a further selected one of said return lines, by means of a predeterminate one of said selected ones of said control lines such that said selected one of said predetermined associated valves is controllable by a pressure prevailing within said further selected one of said return lines.

2. The hydraulic system as defined in claim 1, wherein;

said first control valve comprising means for operating as a shutoff valve; and said selected one of said associated valves contained in said selected ones of said return lines comprising means for operating as a braking valve.

3. A hydraulic system for a rotational drive for a Gatling cannon, said rotational drive containing a primary hydraulic motor and a secondary hydraulic motor, a common rotary drive system for acting on a rotor of the Gatling cannon, means for mechanically coupling said primary hydraulic motor and siad secondary hydraulic motor to said common rotary drive system, said hdyraulic system comprising:

supply lines, return lines and control lines as well as valves operatively interconnected to provide a hydraulic circuit;

said primary hydraulic motor and said secondary hydraulic motor being operatively connected with said supply lines, said return lines, said control lines and said valves such that said secondary hydraulic motor can be automatically and controllably brought into supporting coactive relationship with said primary hydraulic motor;

said supply lines including first supply line means feeding hydraulic fluid to said secondary hydraulic motor;

said valves including a first control valve included in said first supply line means feeding said hydraulic fluid to said secondary hydraulic motor;

said supply lines further including second supply line means feeding hydraulic fluid to said primary hydraulic motor;

said first control valve being connected via selected ones of said control lines at predetermined connecting points to selected ones of said second supply line means feeding hydraulic fluid to said primary hydraulic motor;

said first control valve comprising means for responding to a pressure difference originating at said selected ones of said second supply line means feeding hydraulic fluid to said primary hydraulic motor;

a flow rate regulating valve connected with said selected ones of said second supply line means between said predetermined connecting points for said control lines;

selected ones of said return lines being respectively connected to said primary and said secondary hydraulic motors;

a tank connected in flow communication with said selected ones of said return lines;

said selected ones of said return lines containing predetermined associated valves of said valves including said first control valve for shutting off said selected ones of said return lines during a braking phase of the rotational drive;

bypass lines for bypassing said associated valves;

said valves including an associated check valve for each said bypass lines;

a pressure source connected with said bypass lines;

a second control valve included in said second supply line means feeding hydraulic fluid to said primary hydraulic motor;

a first selected group of said bypass lines being provided with a first check valve and bypassing said first control valve and being operatively connected to said tank; and a second selected group of said bypass lines being provided with a second check valve and bypassing said second control valve and being operatively connected to said tank.

4. A control system for a rotary hydraulic drive means for a Gatling gun, provided with at least one hydraulic motor and mechanical coupling means for transmittting rotary drive motion to a rotor of the Gatling gun, wherein:

said at least one hydraulic motor comprises two hydraulic motors;

said two hydraulic motors comprising a first hydraulic motor serving as a primary drive motor and a second hydraulic motor serving as an auxiliary drive motor;

first supply conduit means for delivering hydraulic fluid from a source of hydraulic pressure to said first hydraulic motor;

second supply conduit means for delivering hydraulic fluid from said source of hydraulic pressure to said second hydraulic motor;

first return conduit means for exhausting hydraulic fluid from said first hydraulic motor to a tank;

second return conduit means for exhausting hydraulic fluid from said second hydraulic motor to said tank;

a control valve arranged conjointly in said first supply conduit means and in said first return conduit means for selectively operatively connecting and disconnecting said first hydraulic motor with and from said source of hydraulic pressure and said tank; and a further control valve defining a shutoff valve arranged conjointly in said second supply conduit means and in said second return conduit means for connecting and disconnecting said second hydraulic motor with and from said source of hydraulic pressure and said tank in response to said control valve arranged in said first supply conduit means such that said second hydraulic motor automatically operates to assist said first hydraulic motor when said first hydraulic motor is supplied with hydraulic fluid at a predetermined operating pressure and automatically ceases assisting said first hydraulic motor when said first hydraulic motor is supplied with hydraulic fluid at pressures less than said predetermined operating pressure.

* * * * *

UNITED STATES PATENT AND TRADEMARK OFFICE
CERTIFICATE OF CORRECTION

PATENT NO. : 4,748,891

DATED : June 7, 1988

INVENTOR(S) : GHERT MEIER

It is certified that error appears in the above-identified patent and that said Letters Patent is hereby corrected as shown below:

Column 5, line 28, please delete "contorl" and insert --control--

Column 6, line 25, please delete "siad" and insert --said--

Signed and Sealed this

Twenty-second Day of November, 1988

Attest:

DONALD J. QUIGG

Attesting Officer

Commissioner of Patents and Trademarks